United States Patent [19]
Ellin et al.

[11] 4,348,087
[45] Sep. 7, 1982

[54] PHOTOGRAPHIC SYSTEM FOR AUTOMATICALLY CHARGING ELECTRONIC FLASH

[75] Inventors: Seymour Ellin, Chestnut Hill; John W. Stempeck, Reading, both of Mass.

[73] Assignee: Polaroid Corporation, Cambridge, Mass.

[21] Appl. No.: 250,853

[22] Filed: Apr. 3, 1981

[51] Int. Cl.³ .............................................. G03B 15/03
[52] U.S. Cl. ..................... 354/139; 354/145; 354/149; 354/195
[58] Field of Search ................. 354/139, 145, 149, 195

[56] References Cited
U.S. PATENT DOCUMENTS 4,001,640  1/1977  Biber .................................. 354/145
4,130,780 12/1978  Ban et al. ........................... 354/145
4,156,565  5/1979  Harrison ............................. 354/195
4,231,645 11/1980  Davis et al. ........................ 354/145

Primary Examiner—Russell E. Adams
Attorney, Agent, or Firm—Edward S. Roman

[57] ABSTRACT

A system for automatically controlling the charging operation of an electronic flash in a photographic apparatus operates to enable the electronic flash to charge in response to readying the camera in anticipation to implementing a photographic exposure cycle and thereafter disabling the charging of the electronic flash as soon as the electronic flash reaches its full charge condition. The control system responds to the subsequent actuation of the camera to initiate a photographic exposure cycle to reenable the electronic flash to again become fully charged. After the electronic flash is fully charged, it is again disabled from further charging during the remainder of the photographic exposure cycle.

18 Claims, 1 Drawing Figure

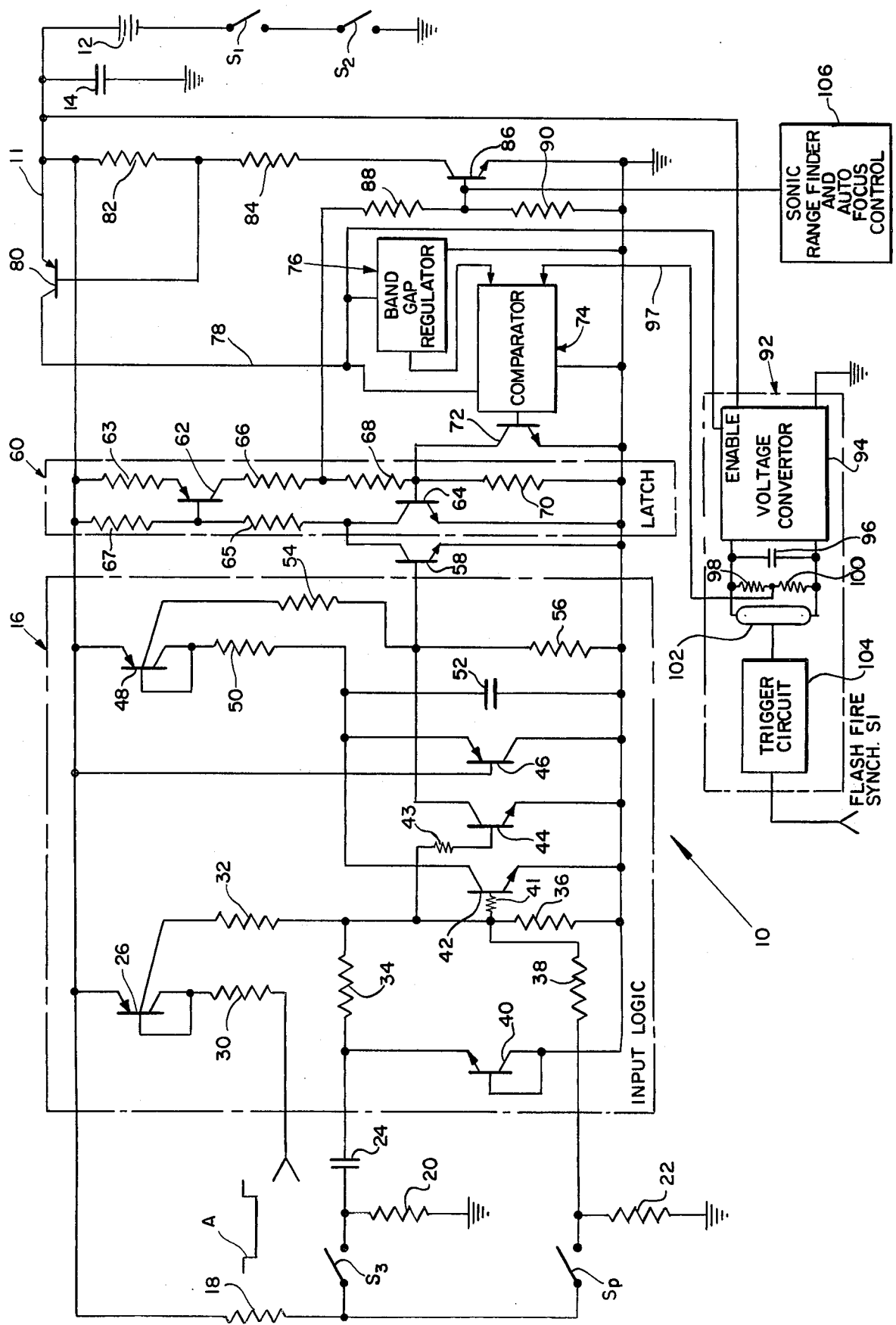

PHOTOGRAPHIC SYSTEM FOR AUTOMATICALLY CHARGING ELECTRONIC FLASH

BACKGROUND OF THE INVENTION

1. Field of the Invention

This invention relates to a camera control system for automatically controlling the charging of an electronic flash and, more particularly, to a camera control system for automatically controlling the charging of an electronic flash as a function of readying the camera in anticipation to implementing a photographic exposure cycle and as a function of actually initiating the photographic exposure cycle.

2. Description of the Prior Art

Fully automatic cameras for use with instant film capable of being folded into a thin, compact shape suitable for convenient carrying in the pocket of a garment are well known in the art as evidenced by the Polaroid SX-70 Land camera, made and sold by the Polaroid Corporation of Cambridge, Mass., U.S.A. Cameras of this type are intended to be used with well-known instant developing film cassettes which include an integral power supply. The power supply, forming an integral part of the cassette, is a battery which supplies electrical energy for the operation of components of the camera in which the film units are exposed and processed. The camera includes various subsystems which, for example, may include an exposure control system, a film transport system, a dark slide removal system, a motor-powered mechanism for processing an exposed film unit, and electronic logic circuits that provide a sequenced control function.

In addition, it would be highly desirable to power an electronic flash from the film cassette battery as is described in U.S. Pat. No. 4,074,295, entitled "Compact Accessory Strobe for Cameras with Battery Enclosed Film Pack," by Richard C. Kee, issued February 14, 1978, or U.S. Pat. No. 4,231,645, entitled "Camera with Telescoping Dual Actuators," by Carl W. Davis et al., issued Nov. 4, 1980, in common assignment herewith. However, powering both the camera electronic systems including the camera motor drive as well as the electronic flash presents a high power drain to the battery which could potentially result in battery failure prior to the exposure of all the film units in the film cassette. Such a battery failure would become likely if the user should turn on the flash and leave it to operate in a continuous charging mode over an extended period of time.

In order to inhibit the user from doing this, there may be provided a dual actuator system as disclosed in U.S. Pat. No. 4,231,645, supra, in which the electronic flash is energized to charge upon actuation of a first button in a dual telescoping button arrangement which is utilized to commence the exposure cycle. Thus, only when the user is ready to actuate the camera to initiate the photographic exposure cycle is the flash charged as a preliminary step to the actuation of the camera thereby eliminating the possibility that the electronic flash might be left in its charging mode of operation over an extended period of time. However, the aforementioned arrangement requires that the flash be charged from a fully discharged condition during this preliminary step in the actuation of the photographic exposure cycle thereby delaying the commencement of the exposure interval by that time required to apply the entire charge to the flash capacitor.

Therefore, it is a primary object of this invention to provide a control system for automatically controlling the charging of an electronic flash in a manner minimizing the power drain from the battery without requiring the entire charging operation to occur as a preliminary step in the actuation of a photographic exposure cycle.

It is a further object of this invention to provide a control system for automatically controlling the charging of an electronic flash as a function of either readying the camera in anticipation to implementing a photographic exposure cycle or as a preliminary step in the actuation of the photographic cycle.

Other objects of the invention will in part be obvious and will in part appear hereinafter. The invention accordingly comprises the mechanism and system possessing the construction, the combination of elements and the arrangement of parts which are exemplified in the following detailed disclosure.

SUMMARY OF THE INVENTION

A photographic control system is provided for use with a camera and electronic flash apparatus of the type having a converter circuit for converting a low DC voltage to a select high DC voltage stored by a capacitor for subsequent discharge through a flashtube to effect a flash of artificial illumination. The control means responds to the readying of the camera in anticipation to implementing a photographic exposure cycle by enabling the converter to operate and convert the low DC voltage to the select high DC voltage. Readying the camera in anticipation to implementing a photographic exposure cycle preferably comprises erecting the camera and closing the film loading door subsequent to the insertion of a film cassette within the camera. The control means thereafter responds to the voltage on the storage capacitor reaching the select high DC voltage level by disabling the converter from further operation so as to allow the select high DC voltage to gradually discharge from the storage capacitor. The control means thereafter responds to the subsequent actuation of the camera to commence the photographic exposure cycle to reenable the converter to again operate and convert the low DC voltage to the select high DC voltage. The control circuit thereafter responds to the voltage on the storage capacitor again reaching the select high DC voltage level to again disable the converter from further operation so as to allow the select high DC voltage to again gradually discharge from the storage capacitor during the remainder of the exposure cycle.

DESCRIPTION OF THE DRAWING

The novel features that are considered characteristic of the invention are set forth with particularity in the appended claims. The invention itself, however, both as to its organization and its method of operation, together with other objects and advantages thereof, will be best understood from the following description of the illustrated embodiment when read in connection with the accompanying drawing where like members have been employed in the different figures to note the same parts and wherein:

The drawing is a circuit diagram for the control system of this invention.

DESCRIPTION OF THE PREFERRED EMBODIMENT

Referring now to the drawing, there is shown a circuit diagram for the control system of this invention which is utilized with a fully automatic camera capable of being folded into a thin, compact shape in a manner as is fully described in U.S. Pat. No. 3,714,879, entitled "Reflex Camera," by Edwin H. Land et al., issued Feb. 6, 1973, and U.S. Pat. No. 3,750,551, entitled "Photographic Apparatus and System with Automatic Film Cover Ejection," by Edwin H. Land et al., issued Aug. 7, 1973, both issued in common assignment herewith and now incorporated by reference herein. The aforementioned camera is intended for use with a disposable film cassette including an integral power supply. Such a cassette is described in considerable detail in U.S. Pat. Nos. 3,543,662, issued Dec. 1, 1970, 3,651,746, issued Mar. 28, 1972, and 3,705,542, issued Dec. 12, 1972, all of which are issued in common assignment herewith and now incorporated by reference herein. These patents describe photographic film assemblages, each of which basically comprises a cassette, an opaque light shield or dark slide, and a plurality of film units, preferably of the self-developing type, arranged in stacked relation and adapted to be exposed and then automatically withdrawn from the cassette and processed in sequential fashion. The power supply, forming an integral part of the cassette, is a battery which supplies electrical energy for the operation of the components of the camera in which the film units are exposed and processed. The camera includes various subsystems whose functions closely correspond to those steps a user would normally perform in a conventional photographic process. Such subsystems include, for example, an exposure control system, a film transport system, a dark slide removal system, a motor-powered mechanism for processing an exposed film unit, and an electronic logic circuit that provides for a sequential control of these functions during an automatic exposure cycle.

The cassette may be directly inserted into a receiving chamber formed in the base of the camera. The bottom of the chamber includes a pair of contacts adapted to engage the terminals of the battery of the cassette when it is disposed within the chamber and an upper portion which, in cooperation with the cassette structure, defines the exposure plane of the camera. After the cassette is inserted into the chamber, a pivotally mounted loading door is swung into a position where it blocks the receiving chamber entrance in a manner as is fully disclosed in U.S. Pat. No. 4,000,500, entitled "Film Cassette Loading Door Latch and Interlock Switch for Photographic Apparatus," by Andrew S. Ivester et al., issued Dec. 28, 1976, in common assignment herewith and now incorporated by reference herein.

Referring again to the drawing, it can be seen that the film cassette battery is schematically shown at 12 with the positive terminal thereof connecting to a positive lead line 11 and a negative terminal thereof connecting to ground by way of two serially-connected switches $S_1$ and $S_2$. When the film loading door of the camera is pivoted to the open position to receive a film cassette, switch $S_1$ automatically opens to disconnect the battery power from the various camera systems as well as the control circuit 10 of this invention. Closure of the film loading door operates in the manner of U.S. Pat. No. 4,000,500, supra, to enable the application of power to the various subsystems within the camera as well as the control circuit 10 of this invention.

Switch $S_2$ is connected to close as a function of extending the camera to its fully erected position in a manner as is fully described in U.S. Pat. No. 3,643,567, entitled "Camera Latch," by Lawrence M. Douglas, issued Feb. 22, 1972, in common assignment herewith and now incorporated by reference herein. Thus, as is now readily apparent, in order for the battery 12 to be connected to the various camera subsystems and the control circuit 10 of this invention, both switches $S_1$ and $S_2$ must be closed and thus the camera must be placed in the erected position with the film loading door closed subsequent to the insertion of a film cassette. Erecting the camera and closing the film loading access door after the insertion of the film cassette readies the camera in anticipation to implementing a photographic exposure cycle and thus the battery 12 automatically becomes connected to the various camera electronic subsystems as well as the control circuit 10 of this invention when it is readied in the aforementioned manner to implement a photographic exposure cycle.

Connecting the battery 12 to the control circuit 10 in the aforementioned manner operates to apply positive voltage by way of the lead line 11 to an input logic circuit as shown generally at 16. The input logic circuit 16 receives a first input control signal upon closure of a switch $S_3$ which may be closed as a function of actuating the camera to commence a photographic exposure cycle after the camera has been readied in the aforementioned manner. In the preferred embodiment, switch $S_3$ is closed as a function of manually depressing the camera cycle actuation button to the first of two positions in a manner as is fully described in U.S. Pat. No. 4,231,645, supra. As is readily apparent, closure of the switch $S_3$ operates to connect a pair of resistors 18 and 20 in series connection with respect to the positive lead line 11 so as to apply the voltage at the point of common connection between the resistors 18 and 20 to the input logic circuit 16 by way of a coupling capacitor 24.

The aforementioned camera may also be provided with a sonic rangefinder and automatic focus control as shown generally at 106 and which is more fully described in U.S. Pat. No. 4,199,246, entitled "Ultrasonic Ranging System for a Camera," by J. Muggli, issued Apr. 22, 1980, and U.S. Pat. No. 4,167,316, entitled "Sonar Controlled Lens Focus Apparatus," by Bruce K. Johnson et al., issued Sept. 11, 1979, in common assignment herewith and now incorporated by reference herein. The automatic focus control 106 is of a unidirectional type in that the movable or focusing element of the lens is always moved from the same or known reference point for focusing purposes. While the focusing element may be movable in either of two axial directions, no lens focusing is performed as the focusing element moves within its focusing range towards the reference point. A park switch $S_p$ is mechanically linked to the adjustable focus lens so as to assume an open condition when the focusing element is in its aforementioned reference point and a closed condition when the focusing element is away from its reference point in a manner as is fully described in U.S. Pat. No. 4,227,790, entitled "Auto/Manual Focus Control Mode Selector," by Edwin K. Shenk, issued Oct. 14, 1980, in common assignment herewith and now incorporated by reference herein. Thus, as is now readily apparent, closure of the switch $S_p$ as a function of the focusing lens element moving away from its reference point and into its focusing range operates to connect the resistor 18 in series with a resistor 22 so as to apply the voltage at the point of common connection between resistors 18 and 22 to the input logic circuit 16.

A third input control signal as shown at A is also applied to the input logic circuit 16 for reasons which will become apparent from the following discussion. The input control signal A assumes a low voltage value for the duration of the camera photographic exposure cycle excluding the time required for the focusing element to reach its desired focus position and is developed by the camera exposure control circuit latch in a manner as is fully described in U.S. Pat. No. 3,750,551, supra. The input control signal A is directed to one collector terminal of a PNP transistor 26 by way of an interconnecting resistor 30. The input control signal received from the switch $S_3$ by way of the coupling capacitor 24 is directed to the other follower collector terminal of the transistor 26 by way of interconnecting resistors 32 and 34. The point of common connection between the capacitor 24 and resistor 34 is connected to ground by way of an NPN transistor 40 connected to operate in a reverse bias diode mode. The output control signal from the switch $S_p$ is also directed to the follower collector terminal of transistor 26 by way of interconnecting resistors 32 and 38. The point of common connection between the resistors 32, 34 and 38 connects to ground by way of another resistor 36 and to the base input terminals of two NPN transistors 42 and 44 by way of resistors 41 and 43, respectively. The collector terminal of transistor 42, in turn, connects by way of a resistor 50 to one collector terminal of a PNP transistor 48. The other follower collector terminal of the transistor 48 is grounded by way of two serially-connected resistors 54 and 56 with the common point of connection between the resistors 54 and 56 being connected to the collector terminal of the transistor 44. The collector terminal of transistor 42 also connects to the positive terminal of a start capacitor 52, the negative terminal of which is grounded. The start capacitor 52 is in parallel connection with respect to the emitter and collector terminals of a PNP transistor 46, the base terminal of which connects to the positive lead line 11 for reasons which will become apparent from the following discussion.

The output signal from the input logic circuit 16 is provided at the point of common connection between the resistors 54 and 56 and is directed to the base terminal of an NPN start-up transistor 58 connected to control a latch circuit as shown generally at 60. The latch circuit 60 comprises a PNP transistor 62 having an emitter terminal connected to the positive lead line 11 by way of a resistor 63 and a base terminal connected to the positive lead line 11 by way of a resistor 67. The base terminal of the transistor 62 also connects by way of a resistor 65 to the collector terminal of an NPN transistor 64, whose emitter terminal is in common grounded connection with the emitter terminal of transistor 58. The base terminal of transistor 64, in turn, connects to the collector terminal of transistor 62 by way of serially-connected resistors 66 and 68 and to ground by way of a resistor 70. The resistor 70 is in parallel connection with respect to the collector and emitter terminals of an NPN reset transistor 72, the base terminal of which is controlled from a comparator 74. The point of common connection between the resistors 66 and 68 is connected by way of a resistor 88 to the base terminal of an NPN transistor 86, the collector terminal of which connects to the positive lead line 11 by way of a pair of serially-connected resistors 82 and 84. The emitter terminal of the transistor 86 is grounded and the base terminal connects to ground by way of an interconnecting resistor 90.

The comparator 74 receives a highly accurate reference voltage from a band gap regulator 76 in a well-known manner. Both the comparator 74 and the band gap regulator 76 are powered from a line 78 connected to the collector terminal of a PNP power transistor 80. The emitter of the transistor 80 connects to the positive lead line 11 while the base terminal thereof connects to the point of common connection between the resistors 82 and 84. The signal level at the base terminal of the transistor 86 provides an enabling signal to the sonic rangefinder and auto focus control 106 in the manner of this invention to be subsequently described herein.

The camera preferably comprises an electronic flash as shown generally at 92 comprising a main storage capacitor 96 which may be charged up to an operating voltage by a conventional voltage converter circuit as shown at 94. The voltage converter 94 operates in a conventional manner to convert a DC voltage as may be derived from the battery 12 which may be in the order of 6 volts to a suitable strobe operating voltage such as 350 volts. A flashtube 102 is connected in parallel relation with respect to the storage capacitor 96 and may be ignited by a trigger circuit 104 of any conventional form which is set in operation by the closing of the conventional synchronous contacts of the camera operating in synchronism with the camera shutter in the usual manner. A resistor divider network comprising resistors 98 and 100 may be provided in parallel connection with respect to the storage capacitor 96 to provide a varying voltage input corresponding to the voltage stored by the capacitor 96 to the comparator 74 by way of an interconnecting line 97.

Operation of the control circuit 10 may proceed in the following manner. The camera is first readied to implement a photographic exposure cycle by being fully erected so as to close switch $S_2$ and by having its film loading access door closed subsequent to the insertion of a film cassette therein so as to close switch $S_1$. In this manner, the battery 12 is connected to power the control circuit 10. Closure of the last of the switches $S_1$ and $S_2$ operates to apply the battery voltage by way of the positive lead line 11 to the emitter terminal of transistor 48 thereby turning on the transistor 48 so as to effect a high current flow from the collector terminals thereof through the resistor 50 so as to charge the start capacitor 52. It may be assumed at this instant that there is no residual charge on capacitor 52 so that the current flow through resistor 50 and capacitor 52 is at a maximum value and thereafter gradually decreases as the charge stored by capacitor 52 increases. The current flow through resistors 54 and 56 follows the current flow through resistor 50 and capacitor 52 so as to turn on the start-up transistor 58 and thereby, in turn, switch on the latch transistors 62 and 64 to set the latch 60 in a conductive mode of operation. As is readily apparent, the progressive increase in charge stored by the capacitor 52 will operate to gradually decrease the current flow through resistor 50 and serially-connected resistors 54 and 56 so as to ultimately turn off transistor 58. However, since the transistors 62 and 64 are connected to operate in a latch mode, the decrease in base current flow to the transistor 58 will not effect the conductive state of the latch 60.

Turning on transistor 62 to a conductive mode operates to effect a high current flow through serially-connected resistors 66, 68 and 70 and also through resistor 88 so as to provide a high base drive current to transistor 86 thereby driving transistor 86 into a high state of conduction. Turning transistor 86 on, in turn, provides a high collector current through serially-connected resistors 82 and 84 so as to effect a high base drive current to the power transistor 80 thereby turning the power transistor 80 on to power up the comparator 74 and band gap regulator 76 by way of the line 78 while simultaneously enabling the voltage converter 94 to become operable to charge up the capacitor 96 to its select voltage level. The voltage converter 94 thereafter operates in the usual manner to charge the capacitor 96 to a select high voltage level as monitored from the resistor divider network 98 and 100 by the comparator 74.

As previously discussed, the band gap regulator 76 provides a highly accurate reference voltage which corresponds to the select high DC voltage to which the capacitor 96 is preferably charged; and, thus, when the output voltage along line 97 from the resistor divider network 98 and 100 reaches the reference voltage from the band gap regulator 76, the capacitor 96 is charged to the select high DC voltage level and the comparator 74 is switched to provide a high output voltage. The reset transistor 72 responds to the high output voltage from the comparator 74 by turning on, thereby turning off the latch transistor 64 and resetting the latch circuit 60 to a non-conductive mode of operation. Turning off the latch circuit 60, in turn, operates to turn off the transistor 86, in turn, turning off the power transistor 80 so as to remove the battery supply voltage along line 78 from the comparator 74 and band gap regulator 76.

Thus, in this manner, the control circuit 10 of this invention operates in response to the readying of the camera in anticipation to implementing a photographic exposure cycle by enabling the voltage converter 94 to operate and convert the low DC battery voltage to a select high DC voltage. The control circuit thereafter responds to the voltage on the storage capacitor 96 reaching its high DC voltage level by disabling the converter 94 from further operation so as to allow the select high DC voltage on the capacitor 96 to gradually discharge from the storage capacitor. As is readily apparent, readying the camera in anticipation to implementing a photographic exposure cycle occurs when the camera is erected and the film loading access door is closed subsequent to the insertion of a film cassette.

The camera would ordinarily be actuated shortly thereafter to commence a photographic exposure cycle by closing the switch $S_3$ in the aforementioned manner as described in U.S. Pat. No. 4,231,645, supra, so as to apply a positive voltage bias by way of the coupling capacitor 24 and interconnecting resistor 34 to the base of transistor 42. The coupling capacitor 24 insures that the positive voltage bias applied upon the closure of switch $S_3$ is of short momentary duration regardless of how long the switch $S_3$ actually remains closed. The transistor 42 is thus driven momentarily to a high mode of conduction so as to discharge the capacitor 52 and reestablish a high current flow through serially-connected resistors 54 and 56 in the aforementioned manner. The high current flow through resistors 54 and 56, in turn, gates transistor 58 on so as to turn transistors 62 and 64 back on in the aforementioned manner thereby reestablishing the conductive mode of operation for the latch circuit 60. Transistors 86 and 80, in turn, are also gated into high states of conduction to reestablish the battery power along line 78 thereby powering up the comparator 74 and the band gap regulator 76 while at the same time enabling the voltage converter 94 to again operate.

Whereas under normal conditions it would be expected that the user would actuate the camera to commence the photographic cycle after only a very short time subsequent to readying the camera in anticipation to implementing a photographic cycle, the charge bled from the capacitor 76 during the intervening time in which the voltage converter 94 was inoperative would be slight and thus the voltage converter 94 could reestablish the select high DC voltage on the capacitor 96 in a relatively short time compared to the time initally required to charge the capacitor 96. Thus, the user is now only required, subsequent to actuating a camera to commence a photographic exposure cycle, to wait only the time required to reestablish the full charge on the capacitor 96 and not the substantially longer time that would be required to charge the capacitor from a fully discharged condition. As is readily apparent, while the voltage converter 94 is operating to replenish the charge on capacitor 96, there is provided from the base input terminal of transistor 86 a disabling signal to disable the operation of the sonic rangefinder and auto focus control 106 until the charge in capacitor 106 reaches its select high DC voltage level. Thus, the control circuit 10 operates to disable the camera from proceeding with the photograpic exposure cycle and, namely, the sonic rangefinding and auto focus control portion of the exposure cycle, which are the first events in the exposure cycle until the full charge has been reestablished on the storage capacitor 96 of the flash 92.

Once the charge on the capacitor 96 reaches its select high DC voltage level, the comparator 74 switches in the aforementioned manner to reset the latch 60 and turn off the transistors 86 and 80 so as to remove the disabling control signal from the sonic rangefinder and auto focus control 106 thereby enabling the camera to proceed with the first step in the exposure cycle which is the sonic determination of the camera-to-subject range.

As previously discussed, movement of the camera focusing element from its reference position into its normal focusing range operates to close switch $S_p$ whereupon the last event to occur in the exposure cycle is the return of the focusing element to its reference position thereby effecting the opening of the switch $S_p$ at the end of the exposure cycle. Immediately prior to the opening of the switch $S_p$ at the termination of the exposure cycle, there is provided a high voltage level to the base terminals of transistors 42 and 44 so as to drive the transistors 42 and 44 into high states of conduction thereby effecting a continuous discharge of the capacitor 52 during the exposure cycle while simultaneously clamping the voltage to a low level at the point of common connection between the resistors 54 and 56 so as to gate transistor 58 off. At the termination of the exposure cycle, however, as previously discussed, the switch $S_p$ is opened thereby removing the base drive current to transistor 42 so as to turn transistors 42 and 44 off and thereby allow a high charging current to charge the capacitor 52. With clamping transistor 46 off, the current through resistors 54 and 56 also correspondingly increases in the aforementioned manner to turn on the start-up transistor 58 and set the latch 60 in a conductive mode of operation. This, in turn, gates transistors 80 and 86 on to provide battery power by way of the line 78 to comparator 74 and band gap regulator 76 while simultaneously enabling the voltage converter 94 to charge the capacitor 96. In this manner, the electronic flash is recharged automatically at the termination of each exposure cycle in the same manner in which it was previously charged when the camera was readied in anticipation to implementing a photographic exposure cycle. The capacitor 96 is charged to its select high voltage level whereupon the comparator 74 is triggered to reset the latch 60 thereby turning off the transistors 80 and 86 to remove battery voltage from the line 78 to the comparator 74 and band gap regulator 76 while simultaneously disabling the voltage converter from further charging.

Cameras of the aforementioned type may also be operated in a manual focus mode in which case the user may not wish or remember to return the focusing element to its reference position prior to initiating the next succeeding photographic exposure cycle. Under these circumstances, it can be seen that the logic input signal A which corresponds to the duration of the exposure cycle excluding the time required for sonic rangefinding and automatic focus provides a low voltage input signal to one collector of the transistor 26 thereby enabling the transistor 26 to turn on and drive the transistors 42 and 44 into conduction to maintain the capacitor 52 in a discharged state while simultaneously clamping the voltage to a low level at the point of common connection between the resistors 54 and 56 so as to gate transistor 58 off.

As is readily apparent, at the end of the photographic exposure cycle, the input control signal A increases to a high level so as to provide a high collector voltage on the transistor 26 thereby turning off the transistor 26 so as to provide a low collector current through resistor 32 and, in turn, a low base drive current to transistors 42 and 44 so as to turn transistors 42 and 44 off. Turning transistors 42 and 44 off immediately reestablishes the high current condition through resistors 54 and 56 so as to provide a high base drive current to transistor 58 thereby setting the latch 60 to its conductive mode of operation. The conductive mode of operation for the latch 60, in turn, gates transistors 86 and 80 on to reestablish the battery power along line 78 to the comparator 74 and band gap regulator 76 while simultaneously enabling the voltage converter 94 to operate and charge the capacitor 96. Capacitor 96 is charged in the aforementioned manner until reaching its high select voltage level at which point the comparator 74 is triggered to reset the latch 60 and turn off the transistors 86 and 80 to remove the battery power along line 78 from the comparator 74 and band gap regulator 76 while simultaneously disabling the voltage converter from further operation. Thus, it can be seen that even under conditions where the automatic focus control is disabled and the focusing element is manually adjusted and not returned to its initial reference position at the end of an exposure interval, there will nevertheless still be provided an automatic recharge of the electronic flash at the end of each exposure interval.

In the event that the camera should be collapsed to open switch S₂, a capacitor 14 will store the battery voltage for a limited time while gradually bleeding off. If the capacitor 52 had also been fully charged immediately prior to collapse of the camera, it becomes readily apparent that if the user quickly reextends the camera there will not be provided the high current condition in the collectors of transistor 48 required to establish the trigger pulse to switch the latch 60 into its conductive mode of operation. In order to minimize the possibilities of this occurring, the transistor 46 operates to discharge the capacitor 52 a short time after the camera is collapsed when the charge in the capacitor 14 decays to a sufficient level to turn on the transistor 46 and thereby effect a discharge of the capacitor 52.

Thus, since certain changes may be made in the above-described system and apparatus without departing from the scope of the invention herein involved, it is intended that all matter contained in the description thereof or shown in the accompanying drawing shall be interpreted as illustrative and not in a limiting sense.

What is claimed is:

1. A photographic control system for use with a camera and electronic flash apparatus of the type having a converter circuit for converting a low DC voltage to a select high DC voltage stored by a capacitor for subsequent discharge through a flashtube to effect a flash of artificial illumination, said control system comprising:

switch means for closing an electrical connection in response to the readying of the camera in anticipation of implementing a photographic exposure cycle; and control means responsive to the closing of said switch means for enabling the converter to operate and convert the low DC voltage to the select high DC voltage and thereafter immediately responsive to the voltage on the storage capacitor reaching the select high DC voltage level for disabling the converter from further operation so as to allow the select high DC voltage to gradually discharge from the storage capacitor, said control means being further responsive to the subsequent actuation of the camera to commence the photographic exposure cycle for reenabling the converter to again operate and convert the low DC voltage to the select high DC voltage and thereafter responsive to the voltage on the storage capacitor again reaching the select high DC voltage level for again disabling the converter from further operation so as to allow the select high DC voltage to again gradually discharge from the storage capacitor during the remainder of the exposure cycle.

2. The control system of claim 1 wherein said control means includes logic means responsive to either the closing of said switch means or the actuation of the camera to commence the photographic exposure cycle for providing an assertive output signal; latch means responsive to said assertive output signal from said logic means for providing another assertive output signal for ultimately enabling the converter to operate and convert the low DC voltage to the select high DC voltage; comparator means responsive to said other output signal from said latch means for comparing a voltage corresponding to the voltage on the storage capacitor with a reference voltage corresponding to the select high DC voltage and for providing a reset signal to said latch means in response to the voltage on the storage capacitor reaching said select voltage so as to reset said latch means and remove said other output signal which enables the converter to operate.

3. The control system of claim 2 wherein said logic means comprises a start capacitor and means for applying a charging current to said start capacitor in response to either the closing of said switch means or the actuation of the camera to commence the photographic exposure cycle and said assertive output signal from said logic means is provided as a function of said charging current applied to said logic means start capacitor.

4. The control system of claim 1 wherein said control means is further responsive to the termination of the photographic exposure cycle for reenabling the converter to again operate and convert the low DC voltage to the select high DC voltage and thereafter responsive to the voltage on the storage capacitor again reaching the select high DC voltage level for again disabling the converter from further operation so as to allow the select high DC voltage to again gradually discharge from the storage capacitor.

5. The control system of claim 4 wherein said control means includes logic means responsive to the closure of said switch means or the actuation of the camera to commence the photographic exposure cycle or the termination of the exposure cycle for providing an assertive output signal; latch means responsive to said assertive output signal from said logic means for providing another assertive output signal for ultimately enabling the converter to operate and convert the low DC voltage to the select high DC voltage; comparator means responsive to said other output signal from said latch means for comparing a voltage corresponding to the voltage on the storage capacitor with a reference voltage corresponding to the select high DC voltage and for providing a reset signal to said latch means in response to the voltage on the storage capacitor reaching said select voltage so as to reset said latch means and remove said other output signal which enables the converter to operate.

6. The control system of claim 5 wherein said logic means comprises a start capacitor and means for applying a charging current to said start capacitor in response to the closure of said switch means or the actuation of the camera to commence the photographic exposure cycle or the termination of the exposure cycle and said assertive output signal from said logic means is provided as a function of said charging current applied to said logic means start capacitor.

7. The control system of claim 1 wherein the camera includes an automatic rangefinder which normally operates in response to actuation of the camera to commence the photographic exposure cycle and wherein said control means disables the rangefinder from operating in response to the actuation of the camera to commence the photographic exposure cycle until the converter establishes the select high DC voltage on the storage capacitor.

8. The control system of claim 7 wherein said control means includes logic means responsive to the closure of said switch means or the actuation of the camera to commence the photographic exposure cycle for providing an assertive output signal; latch means responsive to said assertive output signal from said logic means for providing another assertive output signal for ultimately enabling the converter to operate and convert the low DC voltage to the select high DC voltage and simultaneously disable the rangefinder from operating; comparator means responsive to said other output signal from said latch means for comparing a voltage corresponding to the voltage on the storage capacitor with a reference voltage corresponding to the select high DC voltage and for providing a reset signal to said latch means in response to the voltage on the storage capacitor reaching said select voltage so as to reset said latch means and remove said other output signal which enables the converter to operate.

9. The control system of claim 8 wherein said logic means comprises a start capacitor and means for applying a charging current to said start capacitor in response to the closure of said switch means or the actuation of the camera to commence the photographic exposure cycle and said assertive output signal from said logic means is provided as a function of said charging current applied to said logic means start capacitor.

10. A photographic control system for use with a camera and electronic flash apparatus wherein the camera is of the folding type and includes a film loading access door and wherein the flash apparatus is of the type having a converter for converting a low DC voltage to a select high DC voltage stored by a capacitor for subsequent discharge through a flashtube to effect a flash of artificial illumination, said control system comprising:

switch means for closing an electrical connection in response to the erection of the camera and the closing of the film loading door subsequent to the insertion of a film cassette within the camera and control means responsive to the closure of said switch means for enabling the converter to operate and convert the low DC voltage to the select high DC voltage and thereafter responsive to the voltage on the storage capacitor reaching the select high DC voltage level for disabling the converter from further operation so as to allow the select high DC voltage to gradually discharge from the storage capacitor, said control means being further responsive to the subsequent actuation of the camera to commence the photographic exposure cycle for reenabling the converter to again operate and convert the low DC voltage to the select high DC voltage and thereafter responsive to the voltage on the storage capacitor again reaching the select high DC voltage level for again disabling the converter from further operation so as to allow the select high DC voltage to again gradually discharge from the storage capacitor during the remainder of the exposure cycle.

11. The control system of claim 10 wherein said control means includes logic means responsive to either the closure of said switch means or the actuation of the camera to commence the photographic exposure cycle for providing an assertive output signal; latch means responsive to said assertive output signal from said logic means for providing another assertive output signal for ultimately enabling the converter to operate and convert the low DC voltage to the select high DC voltage; comparator means responsive to said other output signal from said latch means for comparing a voltage corresponding to the voltage on the storage capacitor with a reference voltage corresponding to the select high DC voltage and for providing a reset signal to said latch means in response to the voltage on the storage capacitor reaching said select voltage so as to reset said latch means and remove said other output signal which enables the converter to operate.

12. The control system of claim 11 wherein said logic means comprises a start capacitor and means for applying a charging current to said start capacitor in response to either closure of said switch means or the actuation of the camera to commence the photographic exposure cycle and said assertive output signal from said logic means is provided as a function of said charging current applied to said logic means start capacitor.

13. The control system of claim 10 wherein said control means is further responsive to the termination of the photographic exposure cycle for reenabling the converter to again operate and convert the low DC voltage to the select high DC voltage and thereafter responsive to the voltage on the storage capacitor again reaching the select high DC voltage level for again disabling the converter from further operation so as to allow the select high DC voltage to again gradually discharge from the storage capacitor.

14. The control system of claim 13 wherein said control means includes logic means responsive to the closure of said switch means or the actuation of the camera to commence the photographic exposure cycle or the termination of the exposure cycle for providing an assertive output signal; latch means responsive to said assertive output signal from said logic means for providing another assertive output signal for ultimately enabling the converter to operate and convert the low DC voltage to the select high DC voltage; comparator means responsive to said other output signal from said latch means for comparing a voltage corresponding to the voltage on the storage capacitor with a reference voltage corresponding to the select high DC voltage and for providing a reset signal to said latch means in response to the voltage on the storage capacitor reaching said select voltage so as to reset said latch means and remove said other output signal which enables the converter to operate.

15. The control system of claim 14 wherein said logic means comprises a start capacitor and means for applying a charging current to said start capacitor in response to the closure of said switch means or the actuation of the camera to commence the photographic exposure cycle or the termination of the exposure cycle and said assertive output signal from said logic means is provided as a function of said charging current applied to said logic means start capacitor.

16. The control system of claim 10 wherein the camera includes an automatic rangefinder which normally operates in response to actuation of the camera to commence the photographic exposure cycle and wherein said control means disables the rangefinder from operating in response to the actuation of the camera to commence the photographic exposure cycle until the converter establishes the select high DC voltage on the storage capacitor.

17. The control system of claim 16 wherein said control means includes logic means responsive to the closure of said switch means or the actuation of the camera to commence the photographic exposure cycle for providing an assertive output signal; latch means responsive to said assertive output signal from said logic means for providing another assertive output signal for ultimately enabling the converter to operate and convert the low DC voltage to the select high DC voltage and simultaneously disable the rangefinder from operating; comparator means responsive to said other output signal from said latch means for comparing a voltage corresponding to the voltage on the storage capacitor with a reference voltage corresponding to the select high DC voltage and for providing a reset signal to said latch means in response to the voltage on the storage capacitor reaching said select voltage so as to reset said latch means and remove said other output signal which enables the converter to operate.

18. The control system of claim 17 wherein said logic means comprises a start capacitor and means for applying a charging current to said start capacitor in response to the closure of said switch means or the actuation of the camera to commence the photographic exposure cycle and said assertive output signal from said logic means is provided as a function of said charging current applied to said logic means start capacitor.

* * * * *